(12) United States Patent
Furukawa

(10) Patent No.: US 9,670,880 B2
(45) Date of Patent: Jun. 6, 2017

(54) GASEOUS FUEL FEED APPARATUS

(71) Applicant: DENSO CORPORATION, Kariya, Aichi-pref. (JP)

(72) Inventor: Takashi Furukawa, Nisshin (JP)

(73) Assignee: DENSO CORPORATION, Kariya (JP)

( * ) Notice: Subject to any disclaimer, the term of this patent is extended or adjusted under 35 U.S.C. 154(b) by 93 days.

(21) Appl. No.: 14/717,241

(22) Filed: May 20, 2015

(65) Prior Publication Data

US 2015/0337770 A1    Nov. 26, 2015

(30) Foreign Application Priority Data

May 21, 2014 (JP) ................................. 2014-105328

(51) Int. Cl.
*F02M 21/02* (2006.01)
*F02D 41/40* (2006.01)
(Continued)

(52) U.S. Cl.
CPC ......... *F02M 21/0284* (2013.01); *F02B 43/00* (2013.01); *F02D 19/024* (2013.01); *F02D 41/0027* (2013.01); *F02D 41/3094* (2013.01); *F02D 41/345* (2013.01); *F02D 41/402* (2013.01); *F02M 21/0215* (2013.01); *F02M 21/0278* (2013.01); *F02M 35/10177* (2013.01); *Y02T 10/32* (2013.01); *Y02T 10/44* (2013.01)

(58) Field of Classification Search
CPC .... F02D 19/02–19/022; F02D 19/0686; F02D 41/402; F02D 41/3094; F02M 21/0248; F02M 21/0278; F02M 21/0284; F02M 69/46; F02M 29/00; F02M 61/14; F02M 61/1813

USPC ............... 123/445, 229, 527, 299, 472, 590
See application file for complete search history.

(56) References Cited

U.S. PATENT DOCUMENTS 4,671,234 A * 6/1987 Tegtmeier ........ F02M 35/10072
                                                   123/308
5,992,388 A * 11/1999 Seger ................... F02M 69/044
                                                   123/470
(Continued)

FOREIGN PATENT DOCUMENTS

JP    61-138860    8/1986
JP    61-232373    10/1986
(Continued)

*Primary Examiner* — Lindsay Low
*Assistant Examiner* — Robert Werner
(74) *Attorney, Agent, or Firm* — Nixon & Vanderhye PC

(57) ABSTRACT

A gaseous fuel feed apparatus includes a first injector and a second injector which are provided in each cylinder of a gas engine. The first injector injects a gaseous fuel into an intake passage. The second injector injects the gaseous fuel in an injecting direction intersecting with an injecting direction of the gaseous fuel injected by the first injector, such that the gaseous fuel injected by the second injector collides with the gaseous fuel injected by the first injector. Thus, the gaseous fuel injected by the first injector can be forcibly pressed toward a flow of an air by utilizing an injection energy of the gaseous fuel injected by the second injector. Further, the first injector and the second injector may be placed at the same position of the intake passage, and can be placed at a position of the intake passage that is adjacent to a combustion chamber.

6 Claims, 3 Drawing Sheets

(51) Int. Cl.
*F02M 35/10* (2006.01)
*F02D 41/34* (2006.01)
*F02D 19/02* (2006.01)
*F02D 41/00* (2006.01)
*F02D 41/30* (2006.01)
*F02B 43/00* (2006.01)

(56) References Cited

U.S. PATENT DOCUMENTS 6,196,204 B1 * 3/2001 Janach .................... F02B 43/04
123/527
2013/0095398 A1 4/2013 Kato et al.

FOREIGN PATENT DOCUMENTS

| JP | 61232373 A * | 10/1986 |
| JP | 05231276 A * | 9/1993 |
| JP | 2001-050115 | 2/2001 |
| JP | 2007-278215 | 10/2007 |
| JP | 2013-231428 | 11/2013 |

* cited by examiner

GASEOUS FUEL FEED APPARATUS

CROSS REFERENCE TO RELATED APPLICATION

This application is based on Japanese Patent Application No. 2014-105328 filed on May 21, 2014, the disclosure of which is incorporated herein by reference.

TECHNICAL FIELD

The present disclosure relates to a gaseous fuel feed apparatus supplying gaseous fuel to an intake passage of an internal combustion engine.

BACKGROUND

It is well known that a mixture of a gaseous fuel such as a compressed natural gas and an air is combusted in a combustion chamber of an internal combustion engine and a piston of the internal combustion engine reciprocates according a combustion power of the mixture. A natural gas can have a stable ignitionability by being uniformly mixed with the air. According to JP-2007-278215A, in a gaseous fuel feed apparatus, plural fuel injection ports are provided at different positions of an intake manifold in an axial direction of the intake manifold, so as to advance a mixing of the gaseous fuel and the air.

However, in the gaseous fuel feed apparatus according to JP-2007-278215A, it is necessary to increase a total number of the fuel injection ports to improve an effect of the above configuration. Therefore, the intake manifold may become longer, and a responsivity of the internal combustion engine may be deteriorated.

Further, since the natural gas has a specific gravity less than a specific gravity of the air, the natural gas is readily gathered in an upper area of the intake passage. Thus, even though the gaseous fuel is injected from different positions of the intake manifold in the axial direction of the intake manifold, the natural gas is gathered in an upper area of the intake passage corresponding to the different positions, and it is difficult to determine whether the mixing of the gaseous fuel and the air is advanced.

SUMMARY

The present disclosure is made in view of the above matters, and it is an object of the present disclosure to provide a gaseous fuel feed apparatus in which a deterioration of a responsivity of an internal combustion engine is suppressed and a mixing of a gaseous fuel and an air is advanced.

According an aspect of the present disclosure, the gaseous fuel feed apparatus includes a first injector and a second injector. The first injector injects a gaseous fuel into an intake passage. The second injector injects the gaseous fuel in an injecting direction intersecting with an injecting direction of the gaseous fuel injected by the first injector, such that the gaseous fuel injected by the second injector collides with the gaseous fuel injected by the first injector.

Thus, the gaseous fuel injected by the first injector can be forcibly pressed toward a flow of an air by utilizing an injection energy of the gaseous fuel injected by the second injector. According to the present disclosure, the mixing of the gaseous fuel and the air can be advanced.

Further, it is unnecessary to provide plural injection ports at different positions in the intake passage as a conventional example. That is, the first injector and the second injector may be placed at the same position of the intake passage. Therefore, the first injector and the second injector can be placed at a position that is a downstream end of the intake manifold. In other words, the first injector and the second injector can be placed at a position of the intake passage that is adjacent to the combustion chamber. Thus, according to the present disclosure, the deterioration of the responsivity of the internal combustion engine can be suppressed.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
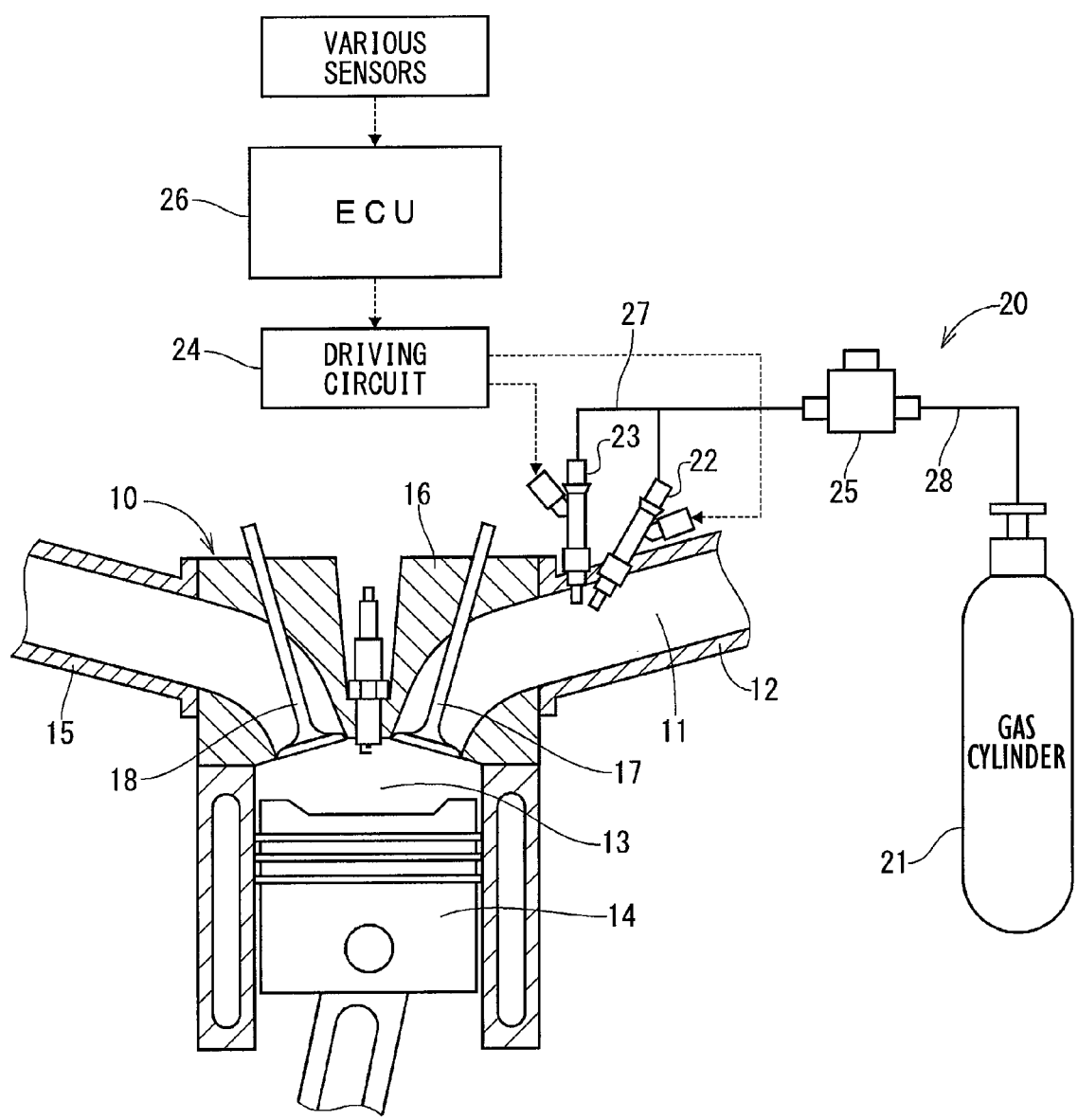
FIG. 1 is a diagram showing an outline of a gaseous fuel feed apparatus according to an embodiment of the present disclosure.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Hereafter, an embodiment of the present disclosure will be described.

A gaseous fuel feed apparatus 20 according to the embodiment is shown in FIG. 1. The gaseous fuel feed apparatus 20 supplies a gaseous fuel to an intake passage 11 of a gas engine 10. The gas engine 10 includes a combustion chamber 13 in which a mixture of an air supplied through an intake manifold 12 of when an intake valve 17 is opened and the gaseous fuel supplied from the gaseous fuel feed apparatus 20 of when the intake valve 17 is opened is combusted, and a piston 14 reciprocating according to a combustion power of the mixture. A reciprocating movement of the piston 14 is converted to a rotational movement by a crank shaft (not shown) and is outputted. When an exhaust valve 18 is opened, the gaseous fuel is discharged into the atmosphere through an exhaust manifold 15. According to the present disclosure, the gas engine 10 is an internal combustion engine.

First, Referring to FIG. 1, an outline of the gaseous fuel feed apparatus 20 will be described.

The gaseous fuel feed apparatus 20 includes a gas cylinder 21, a first injector 22, a second injector 23, a driving circuit 24, a regulator 25, and an electric control unit (ECU) 26.

The gas cylinder 21 is filled with the gaseous fuel. According to the present embodiment, a compressed natural gas may be used as the gaseous fuel.

The first injector 22 and the second injector 23, for example, are provided in the intake manifold 12 with respect to each cylinder, and the first injector 22 and the second injector 23 can inject the gaseous fuel into the intake passage 11. According to the present embodiment, the first injector 22 and the second injector 23 are both an electric injector including an electric driving portion. The electric driving portion is driven by the driving circuit 24.

The regulator 25 is provided in a gas pipe 28 communicating with both the gas cylinder 21 and a distribution pipe 27. The gaseous fuel filled in the gas cylinder 21 is distributed to the first injector 22 and the second injector 23 of each cylinder, after the gaseous fuel is decompressed to a predetermined pressure by the regulator 25 and is introduced into the distribution pipe 27.

The electric control unit 26 includes a microcomputer having a CPU, a ROM, a RAM, and an input/output portion. The electric control unit 26 is electrically connected with the driving circuit 24 and various sensors mounted on a vehicle. The various sensors include an accelerator sensor, a throttle sensor, an intake pressure sensor, a crank angle sensor, a water temperature sensor, a gas temperature sensor, an 02 sensor, a gaseous-fuel pressure sensor, and a gaseous-fuel temperature sensor. The electric control unit 26 controls various devices by executing a program based on detected signals of the various sensors, and controls an operation state of the gas engine 10.

Figure 2:
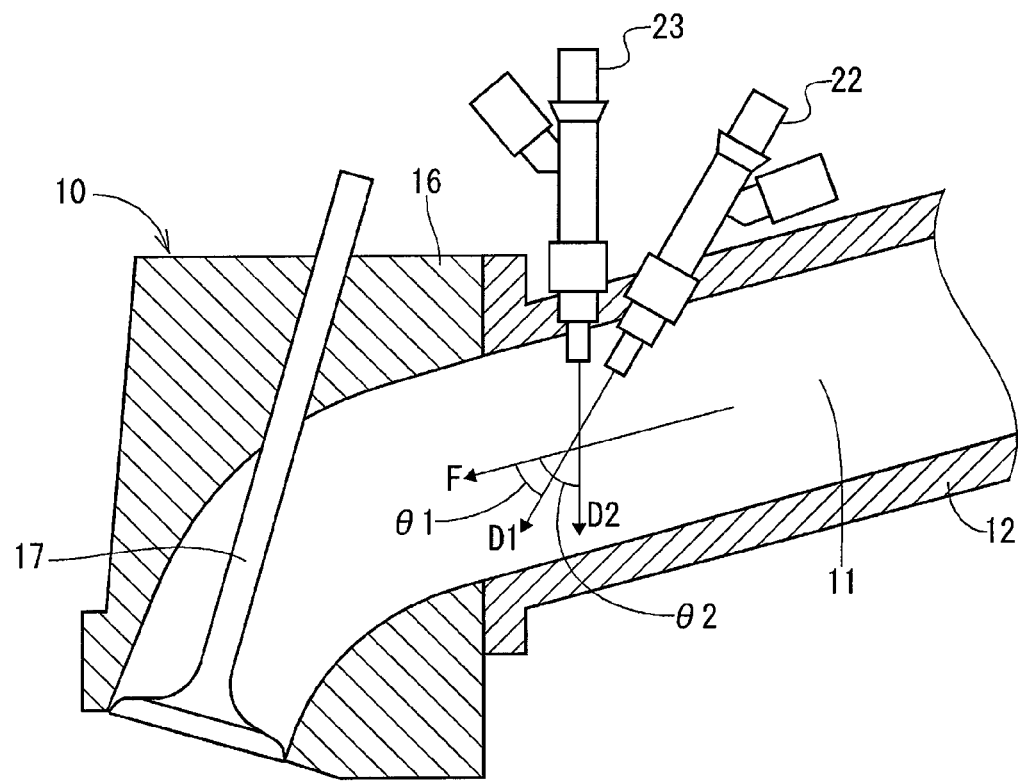
FIG. 2 is an enlarged view of an injector of a gas engine in FIG. 1.
Figure 3:
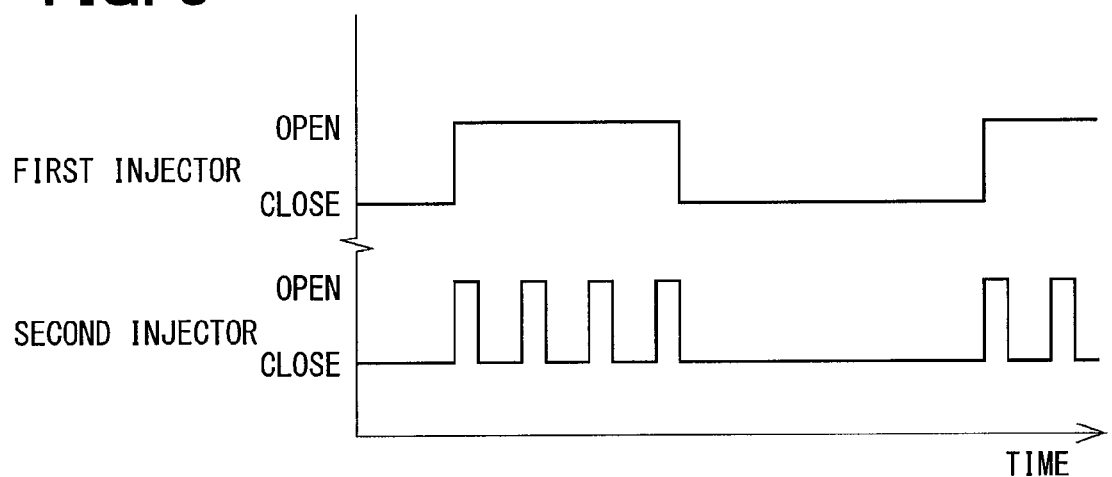
FIG. 3 is a time chart showing a period for driving a first injector to be opened and closed and a period for driving a second injector to be opened and closed in FIG. 1.

Next, referring to FIGS. 1 to 3, a configuration of the gaseous fuel feed apparatus 20 will be described.

Hereafter, an injecting direction of the gaseous fuel according to the first injector 22 is referred to as a first injecting direction D1, and an injecting direction of the gaseous fuel according to the second injector 23 is referred to as a second injecting direction D2.

As the above description, the gaseous fuel feed apparatus 20 includes two injectors 22 and 23 provided in each cylinder. The first injector 22 and the second injector 23 are provided such that an axial center of the first injector 22 intersects with an axial center of the second injector 23. According to the present embodiment, the first injecting direction D1 is as the same as the axial center of the first injector 22, and the second injecting direction D2 is as the same as the axial center of the second injector 23. In other words, the second injecting direction D2 intersects with the first injecting direction D1.

Specifically, the first injector 22 is provided such that an angle θ1 between the first injecting direction D1 and a flow direction F of the intake passage 11 is an acute angle. In other words, the first injecting direction D1 is tilted toward a downstream end of the intake passage 11.

The second injector 23 is provided such that an angle θ2 between the second injecting direction D2 and the flow direction F is greater than the angle θ1. In other words, the second injecting direction D2 is titled toward a lower portion of the intake passage 11 in a vertical direction. According to the present embodiment, the second injector 23 can inject the gaseous fuel downward in the vertical direction.

The electric control unit 26 sets an injection timing of the gaseous fuel and an injection time period (injection quantity) of the gaseous fuel based on the detected signals of the various sensors, and controls the driving circuit 24 based on the injection timing and the injection time period to drive the injectors 22 and 23 to be opened or closed. In this case, as shown in FIG. 3, the electric control unit 26 drives the second injector 23 to be opened and closed at a period less than a period where the electric control unit 26 drives the first injector 22 to be opened and closed. Therefore, the second injector 23 injects the gaseous fuel for multiple times in a period where the first injector 22 injects the gaseous fuel.

As the above description, the gaseous fuel feed apparatus 20 according to the present embodiment includes the first injector 22 and the second injector 23 which are provided in each cylinder of the gas engine 10. The first injector 22 can inject the gaseous fuel into the intake passage 11. The second injector 23 can inject the gaseous fuel in the second injecting direction D2 intersecting with the first injecting direction D1 such that the gaseous fuel collides with the gaseous fuel injected by the first injector 22.

Figure 4:
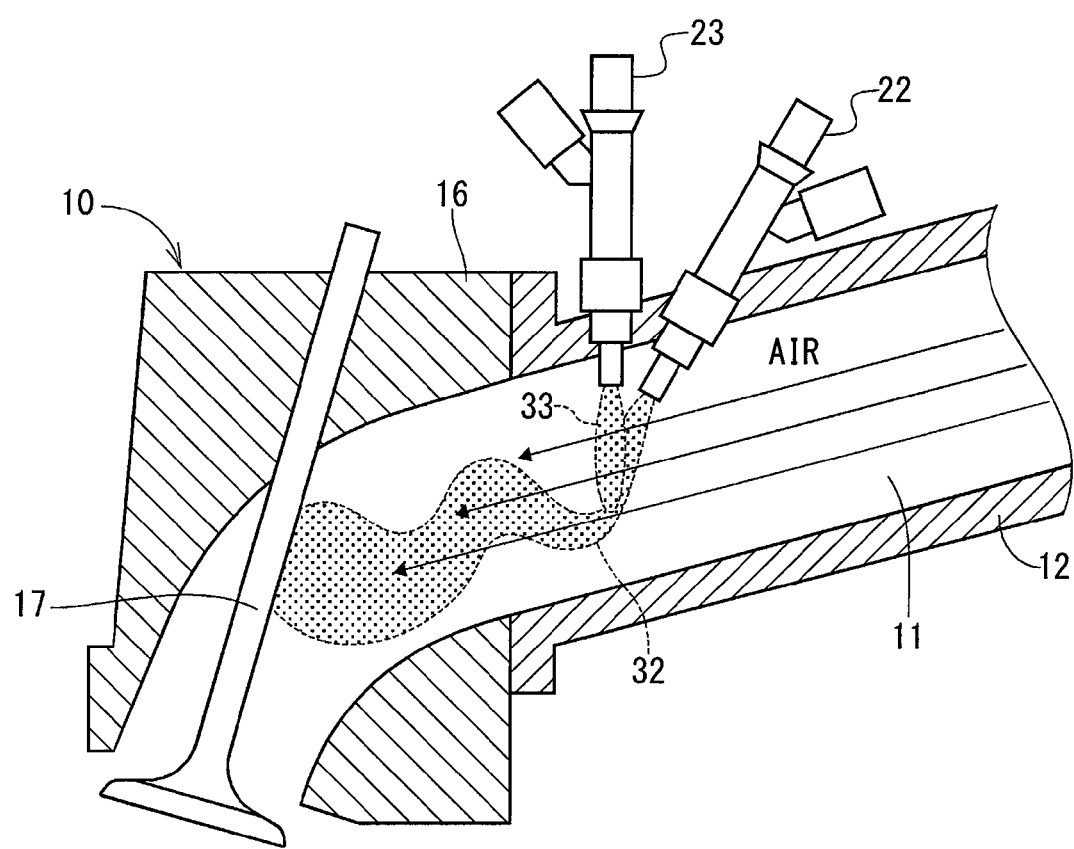
FIG. 4 is a diagram showing a spray of a gaseous fuel injected from the first injector and the spray of the gaseous fuel injected from the second injector.

As shown in FIG. 4, the gaseous fuel 32 injected by the first injector 22 can be forcibly pressed toward a flow of an air by utilizing an injection energy of the gaseous fuel 33 injected by the second injector 23. Therefore, according to the present embodiment, a mixing of the gaseous fuel and the air can be advanced.

The first injector 22 and the second injector 23 may be placed at the same position of the intake passage 11. Therefore, the first injector 22 and the second injector 23 can be placed at a position that is a downstream end of the intake manifold 12. In other words, the first injector 22 and the second injector 23 can be placed at a position of the intake passage 11 that is adjacent to the combustion chamber 13. Thus, according to the present embodiment, a deterioration of a responsivity of the gas engine 10 can be suppressed.

According to the present embodiment, the first injector 22 is provided such that the angle θ1 between the first injecting direction D1 and the flow direction F of the intake passage 11 is an acute angle. Further, the second injector 23 is provided such that the angle θ2 between the second injecting direction D2 and the flow direction F is greater than the angle θ1, and the second injector 23 can inject the gaseous fuel downward in the vertical direction.

Thus, the gaseous fuel 32 to be gathered in an upper area of the intake passage 11 after being injected by the first injector 22 can be pressed toward a lower area by the gaseous fuel 33 injected by the second injector 23.

According to the present embodiment, the electric control unit 26 drives the second injector 23 to be opened and closed at a period less than a period where the electric control unit 26 drives the first injector 22 to be opened and closed. Therefore, the second injector 23 injects the gaseous fuel for multiple times in a period where the first injector 22 injects the gaseous fuel.

Thus, the gaseous fuel 32 injected by the first injector 22 can be more widely sprayed by the gaseous fuel 33 injected by the second injector 23.

Other Embodiment

According to other embodiments of the present disclosure, the first injector and the second injector are not limited to be provided in the intake manifold. For example, the first injector and the second injector may be provided in an engine head.

According to other embodiments of the present disclosure, the first injector and the second injector may be provided that one of the first injector and the second injector is electrically driven and the other one of the first injector and the second injector is mechanically driven.

According to other embodiments of the present disclosure, the first injector and the second injector may be fixed to the intake manifold by being integrally mounted to the intake manifold by a flow-passage forming member.

According to other embodiments of the present disclosure, the second injector is not limited to inject the gaseous fuel in the vertical direction. The second injector may inject the gaseous fuel in a direction toward an upper area or in a horizontal direction. That is, the first injecting direction and the second injecting direction intersect with each other.

According to other embodiments of the present disclosure, the first injecting direction and the second injection direction may intersect with each other at a position outside of the intake passage.

According to other embodiments of the present disclosure, the second injector may inject the gaseous fuel for once in a time period where the first injector injects the gaseous fuel.

According to other embodiments of the present disclosure, the period where the second injector injects the gaseous fuel may be as the same as the period where the first injector injects the gaseous fuel.

According to other embodiments of the present disclosure, a timing of a start of the second injector injecting the gaseous fuel may be different from a timing of a start of the first injector injecting the gaseous fuel. A timing of an end of the second injector injecting the gaseous fuel may be different from a timing of an end of the first injector injecting the gaseous fuel.

The present disclosure is not limited to the embodiments mentioned above, and can be applied to various embodiments within the spirit and scope of the present disclosure.

While the present disclosure has been described with reference to the embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A gaseous fuel feed apparatus supplying a gaseous fuel to an intake passage of an internal combustion engine, the gaseous fuel feed apparatus comprising:
   a first injector configured to inject the gaseous fuel into the intake passage; and
   a second injector configured to inject the gaseous fuel in an injecting direction intersecting with an injecting direction of the gaseous fuel injected by the first injector, such that the gaseous fuel injected by the second injector collides with the gaseous fuel injected by the first injector, wherein
   the second injector is configured to inject the gaseous fuel for a period less than a period where the first injector meets the gaseous fuel, and
   the second injector is configured to inject the gaseous fuel multiple times in a period where the first injector injects the gaseous fuel once.

2. The gaseous fuel feed apparatus according to claim 1, wherein
   the second injector is configured to inject the gaseous fuel downward in the vertical direction.

3. The gaseous fuel feed apparatus according to claim 1, wherein
   an angle between the injecting direction of the gaseous fuel injected by the first injector and a flow direction of the intake passage is referred to as a first angle,
   an angle between the injecting direction of the gaseous fuel injected by the second injector and the flow direction is referred to as a second angle,
   the first angle is an acute angle, and
   the second angle is greater than the first angle.

4. The gaseous fuel feed apparatus according to claim 1, wherein the first injector and the second injector are placed at the same position of the intake passage.

5. The gaseous fuel feed apparatus according to claim 1, wherein the first injector and the second injector are positioned on the same side of the intake passage.

6. The gaseous fuel feed apparatus according to claim 1, wherein the first injector and second injector inject the gaseous fuel respectively in at least partially downward directions.

* * * * *